US008903889B2

(12) United States Patent
Vijaykumar et al.

(10) Patent No.: US 8,903,889 B2
(45) Date of Patent: Dec. 2, 2014

(54) METHOD, SYSTEM AND ARTICLE FOR MOBILE METADATA SOFTWARE AGENT IN A DATA-CENTRIC COMPUTING ENVIRONMENT

(75) Inventors: Karthik Vijaykumar, Tamilnadu (IN); Ock Kee Baek, Unionville (CA); Pradeep Madaiah, Mysore (IN); Seema Prasanth Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/179,837

(22) Filed: Jul. 25, 2008

(65) Prior Publication Data

US 2010/0023577 A1 Jan. 28, 2010

(51) Int. Cl.
G06F 15/16 (2006.01)
G06F 9/54 (2006.01)
G06F 9/48 (2006.01)

(52) U.S. Cl.
CPC ............. *G06F 9/542* (2013.01); *G06F 9/4868* (2013.01)
USPC ............ 709/202; 709/223; 709/224; 709/225

(58) Field of Classification Search
USPC ........... 709/201–202, 223–225; 717/176–177
See application file for complete search history.

(56) References Cited

U.S. PATENT DOCUMENTS

| 6,460,070 | B1* | 10/2002 | Turek et al. ................... 709/202 |
| 7,082,604 | B2* | 7/2006 | Schneiderman ............... 718/100 |
| 7,117,532 | B1* | 10/2006 | Lyle et al. ....................... 726/23 |
| 7,437,733 | B2* | 10/2008 | Manzano ...................... 719/315 |
| 7,853,557 | B2* | 12/2010 | Schneider et al. ............ 707/608 |
| 8,015,604 | B1* | 9/2011 | Tidwell et al. .................. 726/22 |
| 8,122,122 | B1* | 2/2012 | Clingenpeel et al. ......... 709/224 |
| 2002/0062334 | A1* | 5/2002 | Chen et al. ..................... 709/200 |
| 2004/0049698 | A1* | 3/2004 | Ott et al. ........................ 713/201 |
| 2005/0149566 | A1 | 7/2005 | Baek et al. |
| 2005/0165865 | A1* | 7/2005 | Farmer .......................... 707/203 |
| 2005/0193143 | A1* | 9/2005 | Meyers et al. ................ 709/238 |
| 2005/0250552 | A1* | 11/2005 | Eagle et al. ................... 455/567 |
| 2005/0273668 | A1* | 12/2005 | Manning ......................... 714/39 |
| 2006/0136425 | A1 | 6/2006 | Baek |
| 2006/0248139 | A1* | 11/2006 | Sundar .......................... 709/202 |
| 2007/0255704 | A1 | 11/2007 | Baek et al. |
| 2008/0010227 | A1* | 1/2008 | Matichuk ........................ 706/12 |
| 2008/0288547 | A1* | 11/2008 | Brodsky et al. ............... 707/200 |
| 2008/0291014 | A1* | 11/2008 | Chigusa et al. ............... 340/540 |
| 2009/0199173 | A1* | 8/2009 | Ramannavar et al. ........ 717/168 |

OTHER PUBLICATIONS

IBM; "High Performance Computing Based on Asynchronous Messaging for Novel Drug Discovery, Design and Development"; IPCOM000010690D; Jan. 8, 2003; pp. 1-4.
IBM; "e-Science Platform for Cross-institutional, Interdisciplinary, Collaborative Research in Emerging Sciences and Technologies"; IPCOM000134640D; Mar. 13, 2006; pp. 1-5.
David K. Wang, et al., "Towards the Distributed Processing of Mobile Software Agents", pp. 2-5.

\* cited by examiner

*Primary Examiner* — Duyen Doan
(74) *Attorney, Agent, or Firm* — Sughrue Mion, PLLC

(57) ABSTRACT

An event management system that plays a central role in handling varying loads of metadata events from each of a large number of touch-points or data servers that come into a Data Centric computing environment. As a matter of distinction when compared to conventional method-centric computing environments, there is broadly contemplated herein the concept not of physically installing a software agent on a designated system as stationary entity, but of launching it in a distributed computing environment and permitting it to "roam" around the numerous data servers to ensure consistency, accuracy and currency between the data entities managed by multiple data servers and the metadata servers in a data-centric computing environment.

26 Claims, 4 Drawing Sheets

Data-Centric eScience Solution Framework

Mobile Metadata Software Agent structure

METHOD, SYSTEM AND ARTICLE FOR MOBILE METADATA SOFTWARE AGENT IN A DATA-CENTRIC COMPUTING ENVIRONMENT

FIELD OF THE INVENTION

The present invention relates generally to "Data-Centric Distributed Computing" models and the management of data and metadata events in the context of same.

BACKGROUND OF THE INVENTION

There is known a conventional arrangement named the 'eScience solution framework', which is based on a novel distributed computing model called 'Data-Centric Distributed Computing' model. The Data-Centric Distributed Computing model brings about a paradigm shift in the traditional distributed computing model, by moving analytical software programs to data, as opposed to the traditional approach of moving data to software programs. This model allows end-users to dynamically launch software programs as services to data, thus avoiding transfer of a large amount of data across the network, personal information that is protected by statutory requirements for privacy across organizational boundaries, or confidential information relating to intellectual property across institutional boundaries. This Data-Centric Computing Model enables the application software to be launched dynamically as a service from a software library, consequently it obviates the need to install and configure application software on a system. This computing model allows the data to be kept at the source of collection or generation. Typically, a Data Centric Computing environment is very dynamic with a large number of multiple heterogeneous systems. These systems may be distributed across geographical locations and institutional boundaries. A typical Data-Centric computing environment would comprise of the following key components, in addition to one or more portal servers and end-user workstations or appliances: a data server, a software library and a metadata repository. A data server is where the actual data resides and would typically hold data from multiple data sources. The data processing software runs on this system. This could be a database server, a flat file repository, an image data store, etc. The software library includes a repository of software service components as well as a software library manager. This would typically have access to a service catalog that would list the available services. Based on the service consumer's request, the corresponding application software will be dynamically launched as a service to the data server where the data of interest reside. The metadata repository, for its part, has stored therein the metadata that describe the data servers as well as the data sources within them.

A growing and compelling need has been recognized in connection with the effective management of metadata and events in the Data-Centric computing environment, where a large number of events and interactions are anticipated in any of the participating systems just noted. As such, some of the common scenarios are described below with focus on the possible events generated in the Data-Centric computing environment.

In one scenario, an additional Data Server may be added on to the environment and will be registered with the metadata repository for provision of location services for data entities in a data-centric computing environment. Further, when the Data server is updated with new data entities, the metadata repository will be updated with the type of data entities managed by the data server. The type of data could include raw data, observational data, experimental data, pre-processed data, filtered data based on a certain set of filtering rules, post-processed data, curated data, derived data, clustered data, association data, correlation data, modeling data, simulation data, etc. This list shows how many related data entities can be derived out of one set of data entities.

In other scenarios, when there is a change in a data entity, the metadata will be updated to reflect the change to the data entity. When connectivity between the data entities (in the data server) and the metadata server is lost, the latter does not get updated with the changes in the data entities. Subsequently, these changes need to be updated on the next subsequent gain in connectivity. Further, the status of the services (those which were running during the disconnected period) need to be updated on the next subsequent gain in connectivity.

While Data-Centric computing environments provide numerous advantages as detailed hereinabove, it is also evident that in a Data Centric computing environment for a multidisciplinary and cross-institutional collaboration, there can be very large number of data sources (in the order of hundreds or thousands) that act as touch-points, each of which would emanate very large number of events (in the order of millions or billions). This type of complex environment thus presents challenges that to a large extent have not been hitherto addressed or overcome. Accordingly, a need has been recognized in connection with providing a system in place, in the context of a Data-Centric computing environment, that would be responsible for handling such multitudes of events effectively.

SUMMARY OF THE INVENTION

Broadly contemplated herein, in accordance with at least one presently preferred embodiment of the present invention, is an event management system that essentially plays a central role in handling varying load of metadata events, from each of the very large number of touch-points or data servers, that come into the Data Centric computing environment.

As a matter of distinction when compared to conventional method-centric computing environments, there is broadly contemplated herein the concept not of physically installing a software agent on a designated system as a stationary entity, but of launching it in a distributed computing environment and permitting it to "roam" around the multiple data servers to ensure consistency, accuracy and currency between the data entities managed by multiple data servers and the metadata servers in a data-centric computing environment.

In summary, one aspect of the invention provides a method comprising: connecting with a plurality of nodes in a computing environment; ascertaining an event among the nodes; creating a mobile software agent; dynamically provisioning the created mobile software agent to a node associated with the event; and thereupon obtaining information regarding the event.

Another aspect of the invention provides an apparatus comprising: an interface which connects with a plurality of nodes in a computing environment; a mobile software component which acts to: ascertain an event among the nodes; create a mobile software agent; dynamically provision the created mobile software agent to a node associated with the event; and thereupon obtain information regarding the event.

Furthermore, an additional aspect of the invention provides a program storage device readable by machine, tangibly embodying a program of instructions executable by the machine to perform a method comprising: connecting with a plurality of nodes in a computing environment; ascertaining an event among the nodes; creating a mobile software agent; dynamically provisioning the created mobile software agent to a node associated with the event; and thereupon obtaining information regarding the event.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-4, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details are provided, such as examples of programming, software modules, user selections, network transactions, database queries, database structures, hardware modules, hardware circuits, hardware chips, etc., to provide the details of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
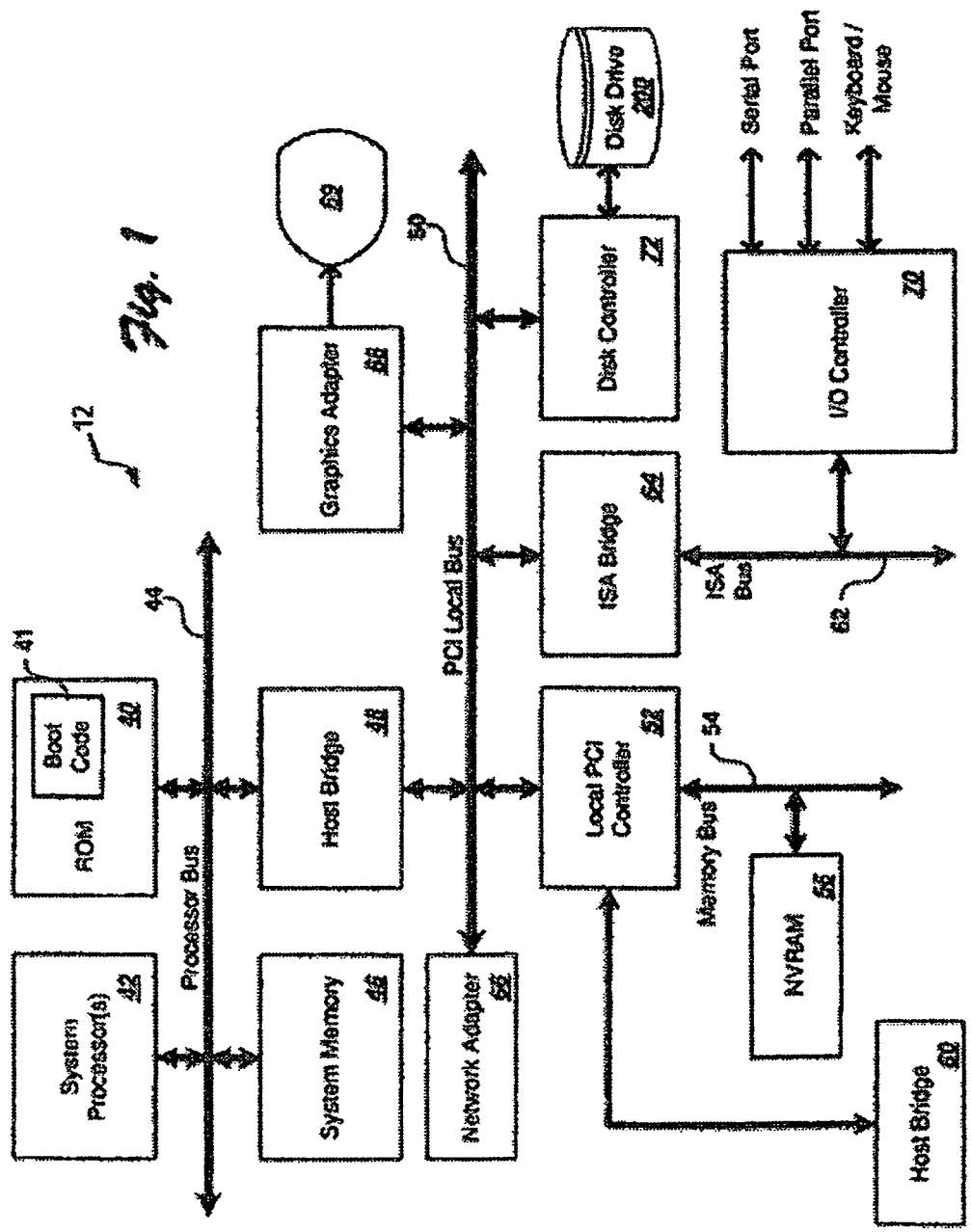
FIG. 1 schematically illustrates an illustrative computer system with which a preferred embodiment of the present invention can be used.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN), and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports, including communication over a wide area network (WAN) such as the Internet. A disk controller 72 is in communication with a disk drive 200 for accessing external memory. Of course, it should be appreciated that the system 12 may be built with different chip sets and a different bus structure, as well as with any other suitable substitute components, while providing comparable or analogous functions to those discussed above.

Figure 2:
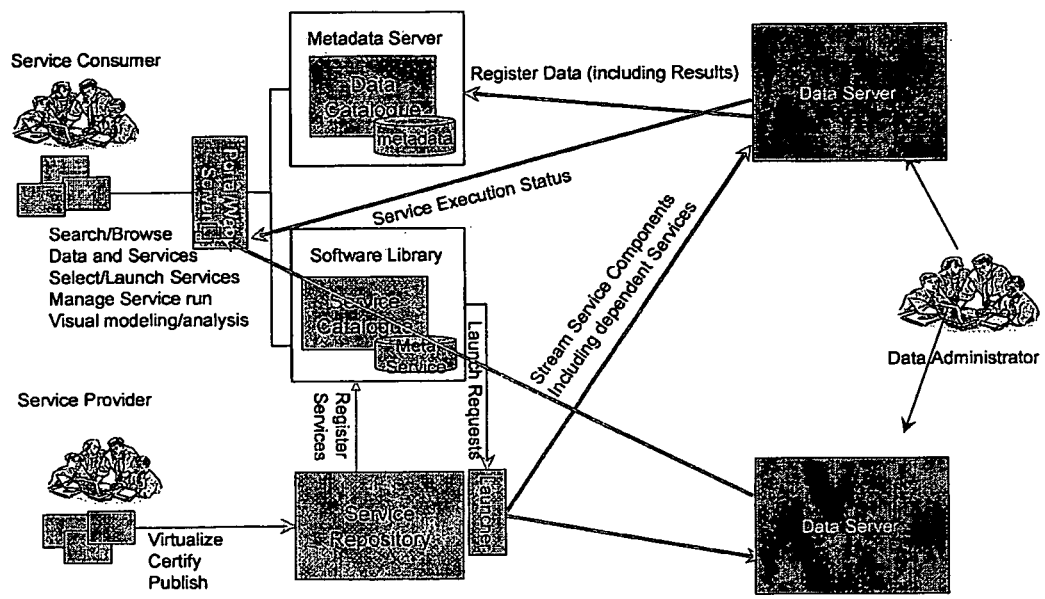
FIG. 2 schematically illustrates a typical data centric computing environment.

An illustrative and non-restrictive example of a typical Data Centric Computing environment is illustrated in FIG. 2, which may be variously referred to throughout the ensuing discussion; a system such as that indicated at 12 in FIG. 1, by way of an illustrative example, could constitute a "service consumer" as shown in FIG. 2.

Generally, there is broadly contemplated herein, in accordance with at least one presently preferred embodiment of the present invention, a novel approach and a method to handle dynamic metadata events (as discussed heretofore) emitted by one or more Data Servers in a Data Centric Computing Environment. This includes updates to the metadata repository as well as other shared system services such as directory services, security services, and system management services.

In this vein, and by way of an illustrative and non-restrictive example, directory services manage the namespace that contains the details of all the data servers in a Data Centric Computing environment. Further, the security services help manage the Data Centric Computing environment for authentication of human users and authorization of their access privileges based on their roles and also for validation of digital signatures of launched software components for their authenticity and integrity and for authorization of their access privileges to computing resources and to data, among others. Yet further, the system management services do the housekeeping of the entire environment, by keeping track of various servers, devices, their connectivity and transaction status. As discussed heretofore, significant challenges are presented in connection with dynamically managing the events and associated messages in a data-centric computing environment, associated with the aforementioned services and otherwise.

Figure 3:
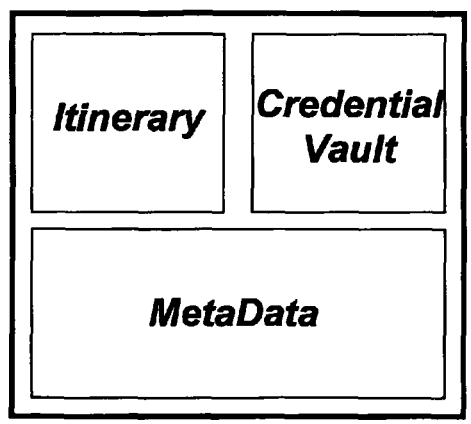
FIG. 3 schematically illustrates a mobile metadata software agent structure.

In order to overcome such challenges, broadly contemplated herein is a novel solution that hereinafter is referred to as a "Mobile Metadata Software Agent" (MobileMSA). A MobileMSA, as schematically illustrated in FIG. 3, is a structured software entity that helps carry the metadata generated at the Data Servers to the Metadata Server. It logically binds the metadata to a destination address along with appropriate security and authentication details. The MSA (Metadata Software Agent) would be responsible for holding information regarding the event. As shown in FIG. 3, it can preferably be structurally divided into three constituent parts: the itinerary, the credential vault and the metadata.

Preferably, the itinerary would contain the host address of the Metadata Server. For its part, the credential vault may preferably contain the user identity information that would be required to authenticate and authorize the MSA (metadata software agent) to the Metadata Server. Finally, the metadata would hold any kind of data associated with the event. This could include the type of the event, source of the event, time of occurrence, etc.

This MobileMSA agent will preferably be dynamically launched as a service from the Software Library to a Data Server, whereupon the MobileMSA instances preferably migrate to the Metadata Server. When a new Data Server is added to the environment, a new instance of MobileMSA Service will preferably be dynamically launched from the shared Software Library (service repository) to the data server. The Credential Vault in the MobileMSA instance is preferably populated with the credentials, and the Itinerary is preferably populated with the Metadata Server address. When there are pending metadata updates, the MobileMSA Service preferably populates the MetaData component of the agent instance with the metadata.

In summary, a novel approach is hereby contemplated in that a mobile software agent migrates from one system to another system in the Data Centric Computing environment to dynamically synchronize the associated metadata for a data entity that is either newly created or updated on a data server in a data-centric computing environment. By contrast, it will be appreciated that in a conventional approach to updating the metadata repository, the events of new data creation or of change to existing data will create a large number of message exchanges in a distributed environment, which may flood the network and consequently render the system unavailable; implementations in accordance with at least one embodiment of the present invention prevent this type of network flooding.

Figure 4:
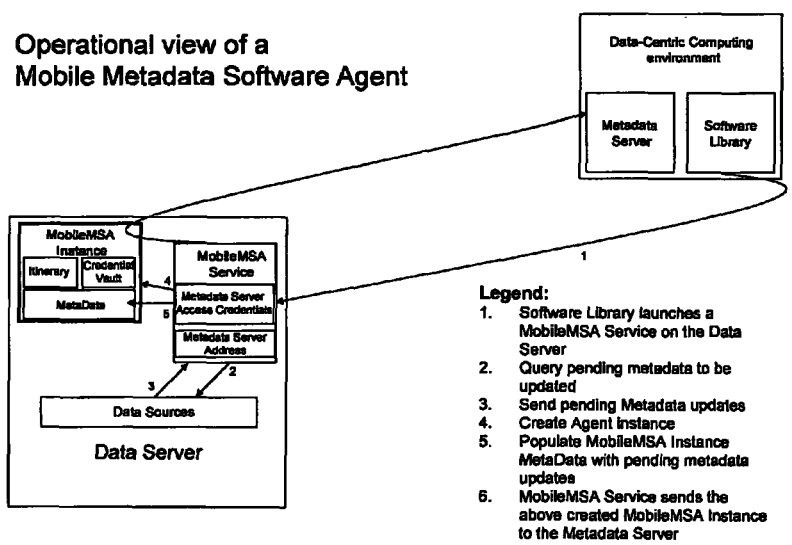
FIG. 4 schematically illustrates a mobile metadata software agent in a data centric computing environment.

FIG. 4 more particularly illustrates a Mobile Metadata Software Agent in a Data Centric Computing environment, in accordance with a preferred embodiment of the present invention. As such, and by way of an illustrative example, the sequence of activities that takes place in an event wherein a Data Server raises a registration request is as follows:

1. The Data Server raises a request for registration to the Data Centric Computing environment.
2. The Software Library in the Data Centric Computing environment launches a MobileMSA Service instance on the virtualized Data Server environment.
3. The MobileMSA Service queries the data sources for any metadata to be updated.
4. The MobileMSA Service creates a MobileMSA Instance.
5. The MobileMSA Service populates the MetaData of the MobileMSA Instance with the pending metadata updates.
6. The MobileMSA Service populates the Itinerary with the location details of the Metadata Server.
7. The MobileMSA Service sends the above created MobileMSA Instance to the Metadata Server.
8. The Metadata Server receives the MobileMSA Instance and checks the Credential Vault of the MobileMSA Instance for the right security credentials. If this step is successful, the Metadata Server updates the Metadata Catalog with the information about the data contained in the "MetaData" of the MobileMSA Instance If the step of checking the Credential Vault for the right security credentials fails, then the Metadata Server ignores the MetaData content in the received MobileMSA Instance.

It will now be shown as well that a MobileMSA Service, in accordance with at least one presently preferred embodiment of the present invention, adds great value in disconnected modes of operation. Considering a mode of operation when the Data Server is connected to the Data Centric Computing environment over a sparse and fragmented network connection, it is very important for the MobileMSA Instance to handle metadata (information about data) updates appropriately. Thus, in accordance with a preferred embodiment of the present invention, a sequence of activities that takes place in the event of a Data Server getting disconnected from the Data Centric Computing environment (e.g., due to a failure of network components) is preferably as follows:

1. A registered Data Server gets disconnected from the Data Centric Computing environment after a certain period of connection to the same.
2. The MobileMSA Service stores the state of the last updated record.
3. Upon not receiving updates from the MobileMSA Service, the Metadata Server updates the status of the resultant metadata in the Metadata Repository.

Thence, a sequence of activities that takes place when a Data Server becomes available in the Data Centric Computing environment may preferably be as follows:

1. A registered Data Server gets connected to the Data Centric Computing environment after a period of disconnection from the same.
2. The MobileMSA Service in the Data Server contacts the Metadata Server, uses the Itinerary to locate the Metadata Server, and updates the Metadata Server connectivity status and metadata update status.
3. The Metadata Server receives the MobileMSA Instance and checks the Credential Vault of the MobileMSA Instance for the right security credentials. If this checking is successful, the Metadata Server updates the Metadata Catalog with the metadata contained in the MetaData component of the MobileMSA Instance. If, however, the checking fails, then the Metadata Server preferably ignores the received MobileMSA Instance.

4. The Metadata Server updates the status of the MobileMSA Service in the Service Catalogue residing in the Software Library.
5. The MobileMSA Service in the Data Server continues to update the metadata that have been accumulated in the Data Sources.

In brief recapitulation, the following are among the many key advantages of a Mobile Metadata Software Agent configured in accordance with at least one preferred embodiment of the present invention: management of dynamic updates of metadata; enabling of automated secure metadata transactions (e.g., metadata updates, that is, updates in information about data); automatic management of secure Data Server registrations; and updating of the same in sparse and fragmented network connections in the Data Centric Computing environment It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of communicating metadata, the method comprising:
   receiving, at a first node, a first mobile software agent capable of autonomously moving between event generating nodes;
   obtaining, by the first mobile software agent, information regarding an event at the node;
   creating a second mobile software agent and populating the second mobile software agent with the obtained information; and
   sending the second mobile software agent populated with the obtained information to a second node.

2. The method according to claim 1, wherein the second mobile software agent is an instance of the first mobile software agent and is created by the first mobile software agent.

3. The method according to claim 1, wherein the obtained information is metadata corresponding to the event at the first node and the second node is a metadata server.

4. The method according to claim 1, wherein the first mobile software agent is not installed on the first node.

5. The method according to claim 3, wherein the first mobile software agent is dynamically provisioned to the first node by the second node in response to the first node generating the event.

6. The method according to claim 1, wherein the nodes comprise data servers; and the event comprises a data event associated with one of the data servers.

7. The method according to claim 1, wherein the second mobile software agent comprises an itinerary, which is populated with a metadata server address relating to the first node associated with the event.

8. The method according to claim 3, wherein the second mobile software agent comprises a metadata component and the metadata component is populated with the metadata corresponding to the event at the first node prior to sending the second mobile software agent to the metadata server.

9. An apparatus, implemented using a processor, comprising:
   an interface which connects with a plurality of nodes in a computing environment; and
   a mobile software component which acts to:
   ascertain an event among the nodes; and
   create a first mobile software agent and provision the first mobile software agent to a first node from among the nodes that generated the event,
   wherein the first mobile software agent is configured to:
   obtain formation regarding the event at the first node;
   create a second mobile software agent and populate the second mobile software agent with the obtained information; and
   send the second mobile software agent populated with the obtained information to a second node.

10. The apparatus according to claim 9, wherein the second mobile software agent is an instance of the first mobile software agent.

11. The apparatus according to claim 9, wherein the obtained information is metadata corresponding to the event at the first node and the second node is a metadata server.

12. The apparatus according to claim 9, wherein the first mobile software agent is configured so as not to install on the first node.

13. The apparatus according to claim 11, wherein the first mobile software agent is dynamically provisioned to the first node by the second node in response to the first node generating the event.

14. The apparatus according to claim 9, wherein the nodes comprise data servers; and the event comprises a data event associated with one of the data servers.

15. The apparatus according to claim 9, wherein the second mobile software agent comprises an itinerary, which is populated with a metadata server address relating to the first node associated with the event.

16. The apparatus according to claim 11, wherein the second mobile software agent comprises a metadata component and the metadata component is populated with the metadata corresponding to the event at the first node prior to sending the second mobile software agent to the metadata server.

17. A non-transitory computer-readable storage medium readable by a machine, tangibly embodying a program of instructions executable by the machine to perform a method comprising:
   receiving, at a first node, a first mobile software agent capable of autonomously moving between event generating nodes;
   obtaining, by the first mobile software agent, information regarding an event at the node;
   creating a second mobile software agent and populating the second mobile software agent with the obtained information; and
   sending the second mobile software agent populated with the obtained information to a second node.

18. The non-transitory computer-readable storage medium according to claim 17, wherein the second mobile software agent is an instance of the first mobile software agent and is created by the first mobile software agent.

19. The non-transitory computer-readable storage medium according to claim 17, wherein the obtained information is metadata corresponding to the event at the first node and the second node is a metadata server.

20. The non-transitory computer-readable storage medium according to claim 17, wherein the first mobile software agent is not installed on the first node.

21. The non-transitory computer-readable storage medium according to claim 19, wherein the first mobile software agent is dynamically provisioned to the first node by the second node in response to the first node generating the event.

22. The non-transitory computer-readable storage medium according to claim 17, wherein the nodes comprise data servers; and the event comprises a data event associated with one of the data servers.

23. The non-transitory computer-readable storage medium according to claim 19, wherein the second mobile software agent comprises an itinerary, which is populated with a metadata server address relating to the first node associated with the event, and the second mobile software agent further comprises a metadata component and the metadata component is populated with the metadata corresponding to the event at the first node prior to sending the second mobile software agent to the metadata server.

24. The method according to claim 1, wherein the second mobile software agent comprises a metadata component that includes metadata corresponding to the event at the first node, an itinerary component that includes an address of a metadata server, and a credential component that includes authentication information for authorizing the second mobile software agent to the metadata server.

25. The apparatus according to claim 9, wherein the second mobile software agent comprises a metadata component that includes metadata corresponding to the event at the first node, an itinerary component that includes an address of a metadata server, and a credential component that includes authentication information for authorizing the second mobile software agent to the metadata server.

26. The non-transitory computer-readable storage medium according to claim 17, wherein the second mobile software agent comprises a metadata component that includes metadata corresponding to the event at the first node, an itinerary component that includes an address of a metadata server, and a credential component that includes authentication information for authorizing the second mobile software agent to the Metadata Server.

* * * * *